United States Patent
Min et al.

(10) Patent No.: US 10,427,584 B2
(45) Date of Patent: Oct. 1, 2019

(54) LAMP APPARATUS

(71) Applicant: HYUNDAI MOBIS Co., Ltd., Seoul (KR)

(72) Inventors: Kyung Gu Min, Yongin-si (KR); Gun Duk Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 16/134,968

(22) Filed: Sep. 19, 2018

(65) Prior Publication Data

US 2019/0092216 A1      Mar. 28, 2019

(30) Foreign Application Priority Data

Sep. 27, 2017   (KR) .................. 10-2017-0125098

(51) Int. Cl.
| | |
|---|---|
| *B60Q 1/00* | (2006.01) |
| *F21S 43/20* | (2018.01) |
| *F21V 5/00* | (2018.01) |
| *F21S 43/31* | (2018.01) |
| *B60Q 1/34* | (2006.01) |
| *F21S 43/50* | (2018.01) |

(52) U.S. Cl.
CPC ............. *B60Q 1/0047* (2013.01); *B60Q 1/34* (2013.01); *F21S 43/26* (2018.01); *F21S 43/315* (2018.01); *F21S 43/51* (2018.01); *F21V 5/007* (2013.01)

(58) Field of Classification Search
CPC ......... B60Q 1/0047; B60Q 1/34; F21S 43/26; F21S 43/315; F21V 5/007; F21V 5/04; F21W 2103/20
See application file for complete search history.

(56) References Cited

U.S. PATENT DOCUMENTS

| | | | | |
|---|---|---|---|---|
| 6,819,505 B1* | 11/2004 | Cassarly | ................. | F21L 4/027 359/708 |
| 9,683,716 B2* | 6/2017 | Wang | ........................ | G02B 3/08 |
| 2006/0007692 A1* | 1/2006 | Hsien | ........................ | F21V 5/00 362/382 |
| 2014/0146546 A1* | 5/2014 | Yamada | .................... | F21V 5/04 362/311.06 |

(Continued)

FOREIGN PATENT DOCUMENTS

| | | |
|---|---|---|
| JP | 2006-301544 | 11/2006 |
| JP | 2012-033413 | 2/2012 |

(Continued)

OTHER PUBLICATIONS

Notice of Allowance dated Mar. 27, 2019, issued in the Korean Patent Application No. 10-2017-0125098.

*Primary Examiner* — Peggy A Neils
(74) *Attorney, Agent, or Firm* — H.C. Park & Associates, PLC (57) ABSTRACT

A lamp apparatus may include: a light source having a light source installed therein; optics including an inlet configured to receive light irradiated from the light source, a outlet configured to discharge the light inputted from the inlet and having a plurality of facets formed thereon, and an optical connector connecting the inlet and the outlet; a light guide positioned between the light source and the optics, and configured to guide the light irradiated from the light source toward the optics; and a support configured to support the optics or the light guide.

10 Claims, 12 Drawing Sheets

(56) References Cited

U.S. PATENT DOCUMENTS

| | | |
|---|---|---|
| 2016/0116131 A1 | 4/2016 | Jeong |
| 2018/0058661 A1* | 3/2018 | Shim .......................... F21V 5/04 |
| 2018/0345846 A1* | 12/2018 | Alisafaee ................ F21S 43/31 |
| 2018/0363872 A1* | 12/2018 | Jo .......................... F21S 41/141 |

FOREIGN PATENT DOCUMENTS

| | | |
|---|---|---|
| JP | 2016-009065 | 1/2016 |
| KR | 10-2016-0048377 | 5/2016 |
| KR | 10-2016-0149917 | 12/2016 |
| KR | 10-2017-0045805 | 4/2017 |

* cited by examiner

LAMP APPARATUS

CROSS-REFERENCES TO RELATED APPLICATION

This application claims priority from and the benefit of Korean application number 10-2017-0125098, filed on Sep. 27, 2017, which is hereby incorporated by reference for all purposes as if set forth herein.

BACKGROUND

Field

Exemplary embodiments to a lamp apparatus, and more particularly, to a lamp apparatus which is applied to a signal lamp or the like of a vehicle and indicates the moving direction of the vehicle.

Discussion of the Background

In general, a lamp apparatus applied to a vehicle is classified into a headlight for illuminating the front of the vehicle, a taillight for illuminating the rear of the vehicle, and a signal lamp indicating the driving direction of the vehicle or the like.

The conventional lamp apparatus applied to the vehicle includes an optic unit for guiding the movement of light, in order to adjust the irradiation direction and irradiation shape of light to a preset direction and shape. However, since the lamp apparatus uses only light generated by a light source unit, the visibility and the sense of beauty of the lamp apparatus are degraded when the lamp apparatus is turned off. Therefore, there is a demand for a device capable of solving the problem.

The related art is disclosed in Korean Patent Publication No. 10-2016-0048377 published on May 4, 2016 and entitled "Turn signal lamp using laser".

The above information disclosed in this Background section is only for enhancement of understanding of the background of the invention and, therefore, it may contain information that does not constitute prior art.

SUMMARY

Exemplary embodiments of the present invention are directed to a lamp apparatus which can implement a light emitting effect by not only using light emitted from a light source when a light source is turned on, but also using external light such as solar light even when the light source is turned off.

In one exemplary embodiment, a lamp apparatus may include: a light source; optics including an inlet configured to receive light irradiated from the light source, a outlet configured to discharge the light inputted from the inlet and having a plurality of facets formed thereon, and an optical connector connecting the inlet and the outlet; a light guide positioned between the light source and the optics, and configured to guide the light irradiated from the light source toward the optics; and a support configured to support the optics or the light guide.

The inlet may be formed concavely toward the outlet.

The inlet may include: a first inlet formed concavely toward the outlet, and formed in a ring shape such that the circumference thereof is connected to the optical connector; and a second inlet formed in an aspheric shape that is concave toward the outlet, such that the circumference thereof is connected to the inner circumferential surface of the first inlet.

The outlet may include: a table formed perpendicular to the rotation axis of the optics; and a discharge surface connecting the table and the optical connector, and having the plurality of facets formed on the outer circumferential surface thereof.

The table may be formed in a polygonal shape, and the discharge surface may have a plurality of first to third discharge facets formed on the outer circumferential surface thereof, wherein the first discharge facets are connected to the respective edges of the table, the second discharge facets are connected to the optical connector, and the third discharge facets connect the first discharge facets and the second discharge facets.

The optical connector may include: a discharge connector connected to the outlet; and an input connector connecting the discharge connector and the inlet, and having a width decreasing toward the inlet.

The input connector may have a plurality of first and second connection facets alternately arranged on the outer circumferential surface thereof, wherein the first connection facet has a width decreasing toward the inlet from the discharge connector, and the second connection facet has a width decreasing toward the discharge connector from the inlet.

The light guide may include a total internal reflection (TIR) lens of which the width increases toward the optics from the light source.

The support may include: a support base having the light guide mounted therein; and an optic support connecting the support base and the optics so as to support the optic.

The support base may include: a first support base having a first guide mounting groove formed in a concave shape corresponding to one end of the light guide, and supporting the one end of the light guide; and a second support base having a second guide mounting groove formed in a concave shape corresponding to the other end of the light guide so as to support the other end of the light guide, and detachably coupled to the first support base.

The optic support may include: an optics holder on which the optics are held; and a support adjuster having the optic holder movably mounted therein, and coupled to the support base.

The optic holder may include: an optic holder body movably inserted into the support adjuster; and an optic holding groove formed concavely in the optic holder body, such that the optics are held in the optic holding groove.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 1:
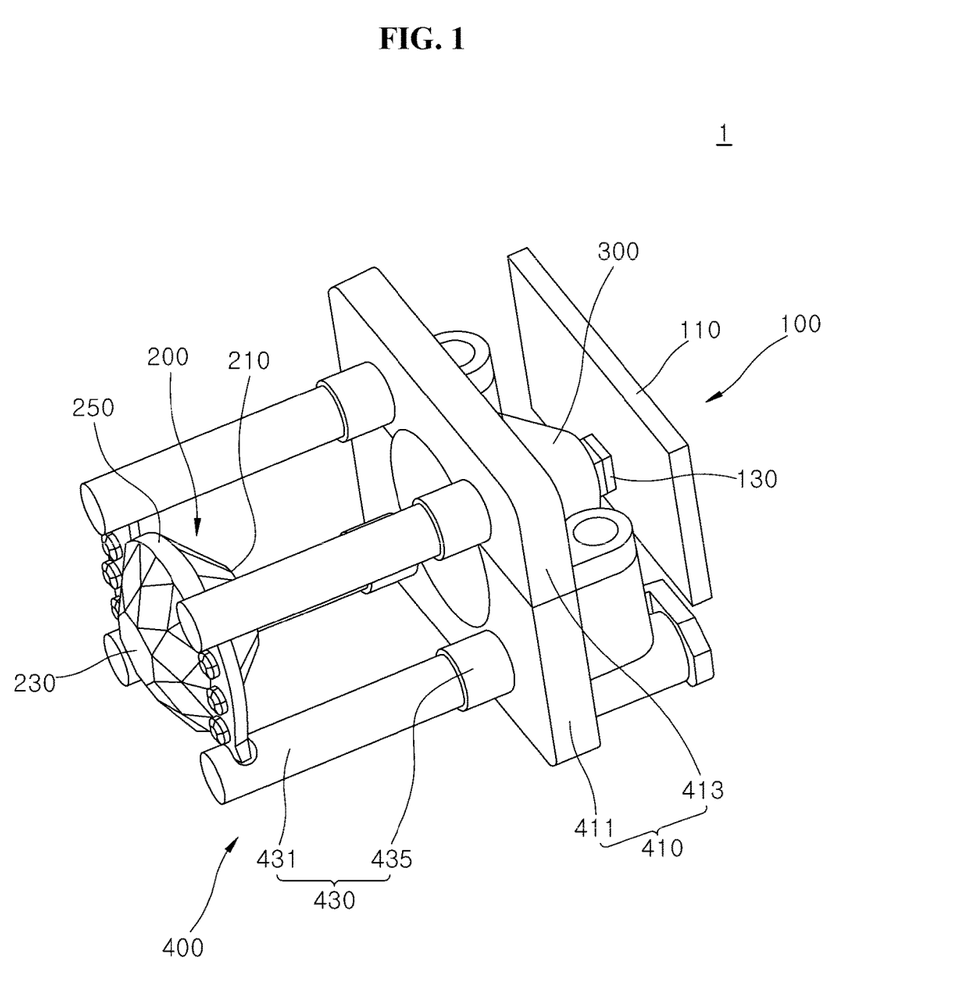
FIG. 1 is a perspective view schematically illustrating a lamp device in accordance with an embodiment of the present invention.

FIG. 1 is a perspective view schematically illustrating a lamp device in accordance with an embodiment of the present invention. Referring to FIG. 1, the lamp apparatus 1 in accordance with the embodiment of the present invention may include a light 100, an optic unit or optics 200, a light guide 300 and a support 400, and illuminate the front or rear of a vehicle or indicate the driving direction of the vehicle or the like.

The light 100 may include a light source 130 to generate light. In the present embodiment, the light 100 may include a PCB 110 separated from the optics 200 and the light source 130 mounted on the PCB 110 and generating light according to an input signal. The light source 130 may include an LED and the like.

Figure 2:
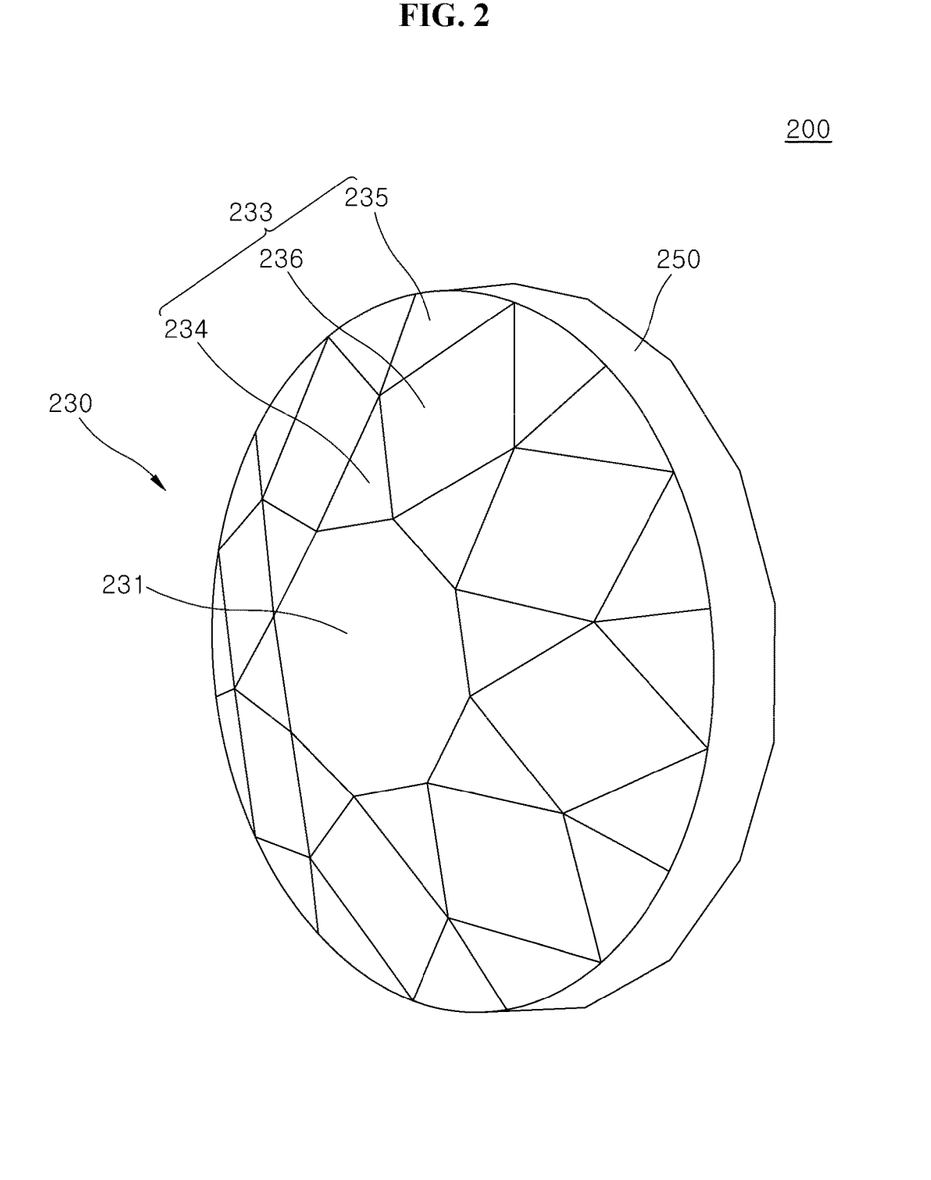
FIG. 2 is a perspective view schematically illustrating an optic unit, i.e., optics, in accordance with the embodiment of the present invention.
Figure 3:
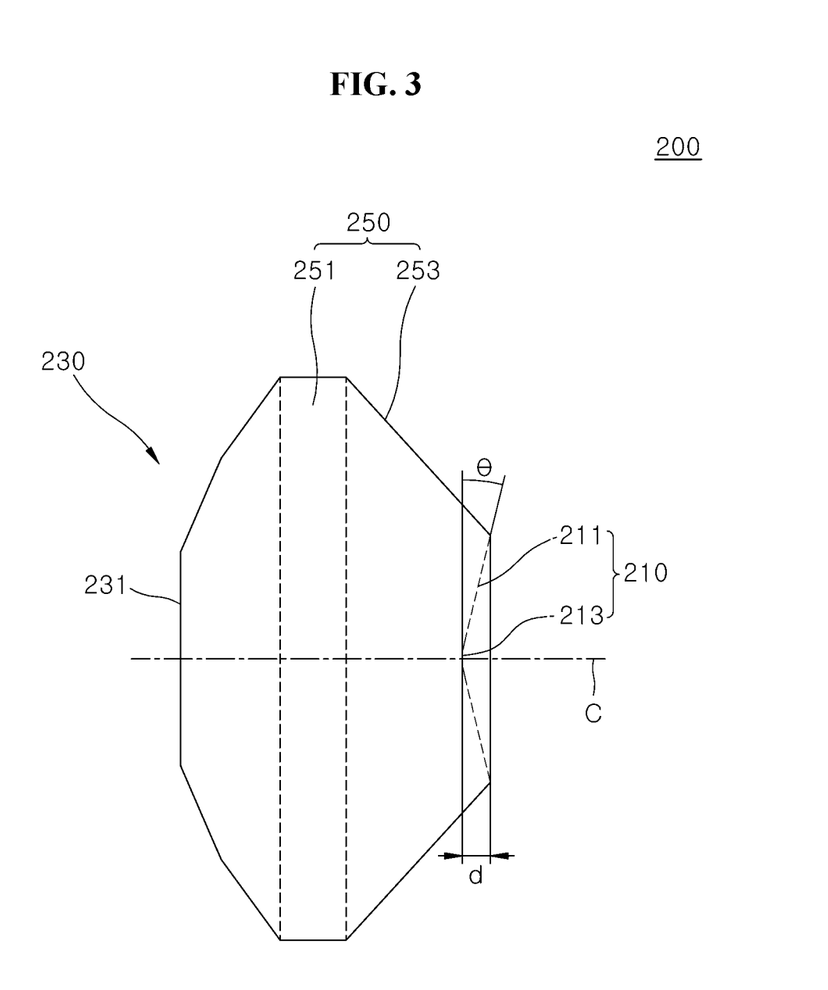
FIG. 3 is a cross-sectional view schematically illustrating the optic in accordance with the embodiment of the present invention.

FIG. 2 is a perspective view schematically illustrating the optics in accordance with the embodiment of the present invention, and FIG. 3 is a cross-sectional view schematically illustrating the optics in accordance with the embodiment of the present invention.

Referring to FIGS. 2 and 3, the optics 200 may irradiate light forward when the light source 130 is turned on, the light being directly inputted from the light 100 or inputted through the light guide 300.

Even when the light 100 is turned off, the optics 200 may absorb light such as solar light, inputted from outside, and reflect the absorbed light to improve the sense of beauty of the lamp apparatus. In the present embodiment, the optics 200 may include an inlet 210, a outlet 230 and an optical connector 250.

Figure 4:
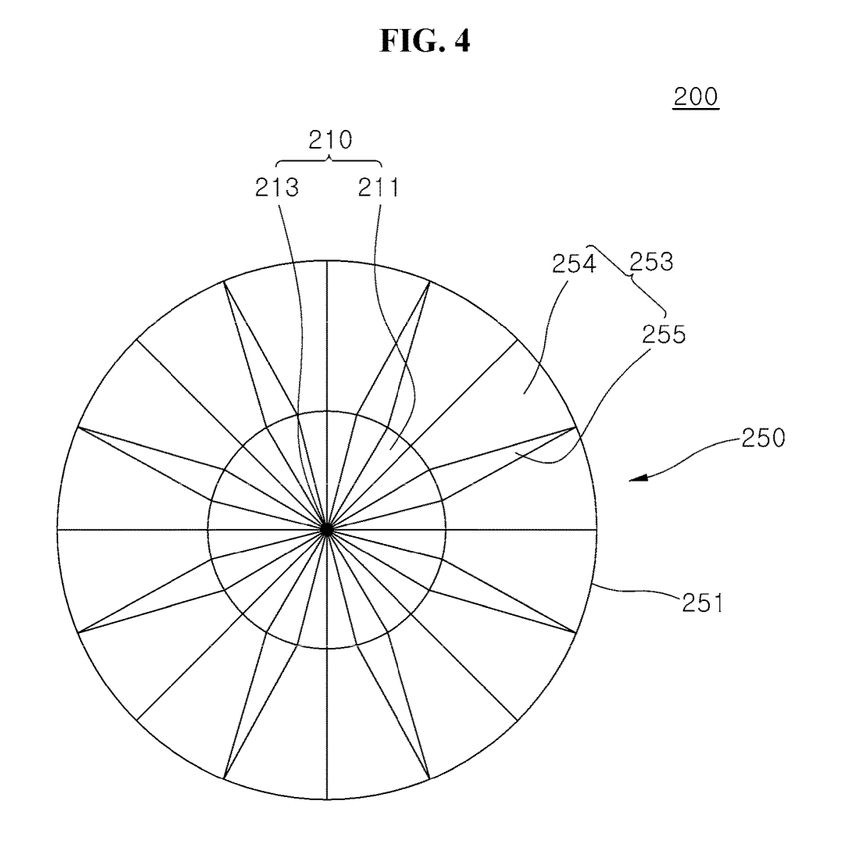
FIG. 4 is a rear view illustrating an inlet and an optical connector of the optics in accordance with the embodiment of the present invention.
Figure 5A:
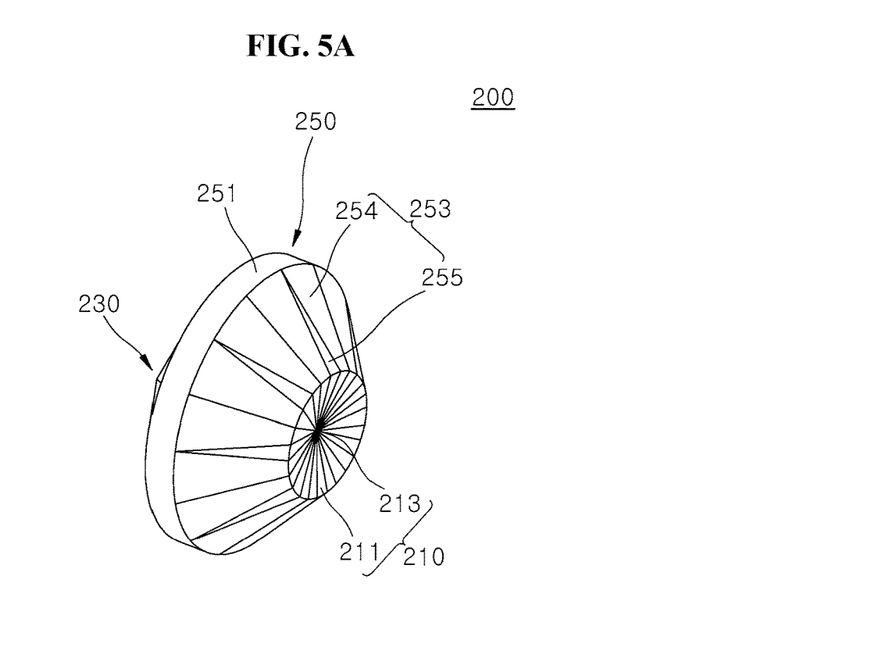
FIG. 5A is a perspective view illustrating the inlet of the optics in accordance with the embodiment of the present invention and FIG. 5B is a close-up view of a portion of the inlet.
Figure 5B:
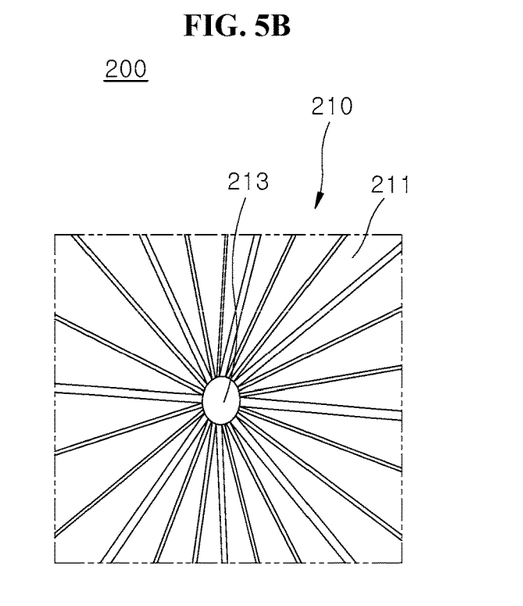
Figure 6:
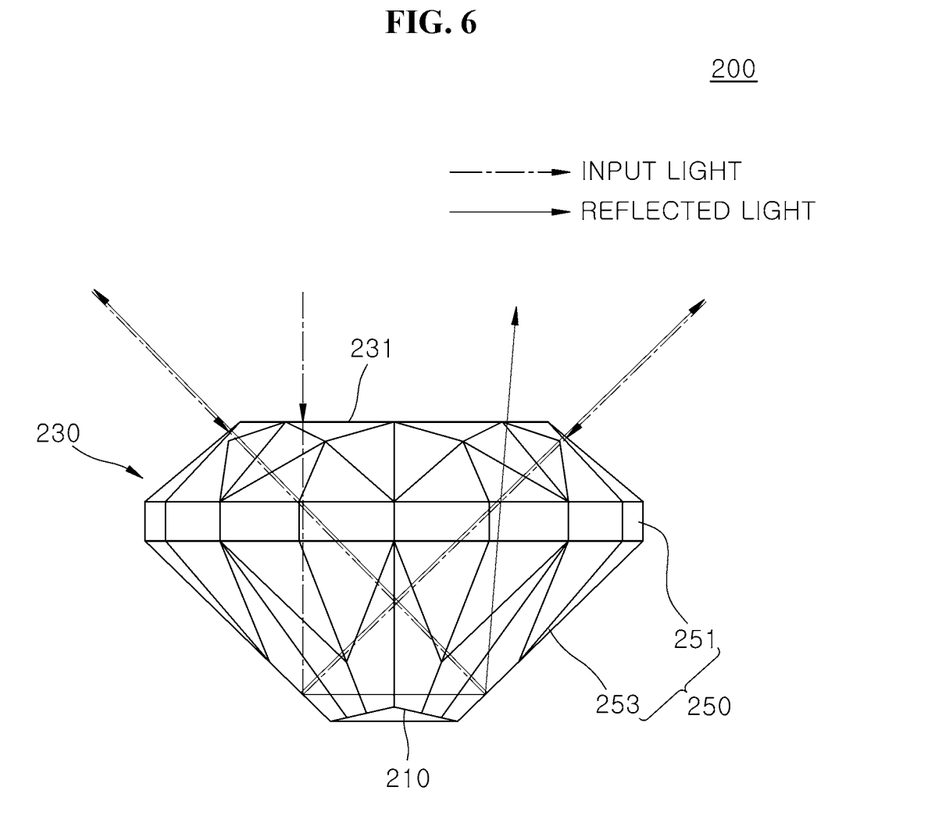
FIG. 6 illustrates a path of light inputted to the optics in accordance with the embodiment of the present invention.

FIG. 4 is a rear view illustrating the inlet and the optical connector of the optics in accordance with the embodiment of the present invention, FIG. 5A is a perspective view illustrating the inlet of the optics in accordance with the embodiment of the present invention, FIG. 5B is a close-up view of a portion of the inlet, and FIG. 6 illustrates a path of light inputted to the optics in accordance with the embodiment of the present invention.

Referring to FIGS. 4 to 6, when the light 100 is turned on, light irradiated from the light 100 may be directly inputted to the inlet 210 or inputted to the inlet 210 through the light guide 300.

In the present embodiment, the inlet 210 may be formed concavely toward the outlet 230, and prevent an occurrence of hot spot by light discharged from the optics 200. The inlet 210 may include first and second inlets 211 and 213.

The first inlet 211 may be formed concavely toward the outlet 230, and formed in a ring shape such that the circumference thereof is connected to the optical connector 250. In the present embodiment, the first inlet 211 may be recessed toward the outlet 230.

The angle θ between the first inlet 211 and a normal line perpendicular to the rotation axis C may be set in the range of 5 to 30 degrees, and the maximum recess depth d of the first inlet 211 may be set to less than ⅓ of the total thickness of the optics 200. Thus, an occurrence of hot spot can be prevented while light inputted through the inlet 210 passes through the optics 200, and light discharged through the outlet 230 can be prevented from interfering with the inlet 210 as much as possible.

The second inlet 213 may be formed in an aspheric shape that is concave toward the outlet 230, and prevent an occurrence of hot spot by concentration of light, and the circumference of the second inlet 213 may be connected to the inner circumferential surface of the first inlet 211, such that the second inlet 213 can improve the sense of beauty of the optics 200 with the first inlet 211 when the light source is turned on or off.

The outlet 230 may discharge light inputted from the inlet 210, and have a plurality of facets formed therein. In the present embodiment, the outlet 230 may include a table 231 and a discharge surface 233, which can implement the function of the crown of a jewel such as diamond.

The table 231 may be formed perpendicular to the rotation axis of the optics 200. In the present embodiment, the table 231 may be formed in a polygonal shape, for example, an octagonal shape, and absorb light inputted from outside while discharging the light transferred through the inlet 210 to the outside.

The discharge surface 233 may connect the table 231 and the optical connector 250, and have a plurality of facets formed on the outer circumferential surface thereof. In the present embodiment, the plurality of facets formed on the discharge surface 233 may include a plurality of first to third discharge facets 234 to 236.

The plurality of first discharge facets 234 may be connected to the respective edges of the table 231 formed in a polygonal shape. In the present embodiment, each of the first discharge facets 234 may be formed in a triangle shape that has one side corresponding to an edge of the table 231 and has a width decreasing toward the inlet 210.

The plurality of second discharge facets 235 may be connected to the optical connector 250. In the present embodiment, each of the second discharge facets 235 may be formed in a triangle shape that has one side which is in contact with the optical connector 250, and has a width decreasing toward the table 231.

The plurality of third discharge facets 236 may connect the first and second discharge facets 234 and 235. In the present embodiment, each of the third discharge facets 236 may be formed in a rectangular shape which shares one edges of two first discharge facets 234 formed in a triangle shape and one edges of two second discharge facets 235 formed in a triangle shape, and positioned between the first discharge facets 234 and the second discharge facets 235.

The table 231 and the first to third discharge facets 234 to 236, which are formed on the outlet 230, may irradiate light toward the front of the optics 200, the light being transferred through the inlet 210, and increase the amount of external light such as solar light, absorbed by the optics 200. Thus, even when the light 100 is turned off, the glittering of the optics 200 may be increased.

The optical connector 250 may connect the inlet 210 and the outlet 230, and transfer light inputted through the inlet 210 toward the outlet 230. When the light 100 is turned off, the optical connector 250 may reflect light inputted through the outlet 230 such that the reflected light is discharged toward the outlet 230, thereby implementing the roles of the pavilion and girdle of a jewel such as diamond. In the present embodiment, the optical connector 250 may include a discharge connector 251 and an input connector 253.

The discharge connector 251 may be connected to the outlet 230. In the present embodiment, the discharge connector 251 may be formed in a disk shape, and have one side surface connected to the outlet 230 and the other side surface connected to the input connector 253. The discharge connector 251 may correspond to a portion that has the largest diameter in the optics 200.

The input connector 253 may connect the discharge connector 251 and the inlet 210, and have a cone shape of which the width decreases toward the inlet 210. In the present embodiment, the input connector 253 may have a plurality of first and second connection facets 254 and 255 formed on the outer circumferential surface thereof.

The first connection facet 254 may be formed in a triangle shape of which the width decreases toward the inlet 210 from the discharge connector 251, and the second connection facet 255 may be formed in a triangle shape of which the width decreases toward the discharge connector 251 from the inlet 210.

The plurality of first connection facets 254 and the plurality of second connection facets 255 may be alternately arranged. The number of first connection facets 254 and the number of second connection facets 255 may be changed depending on the specification of the optics 200. In the present embodiment, 12 first connection facets 254 and 12 second connection facets 255 may be alternately arranged in the circumferential direction around the rotation axis C of the optics 200.

Figure 7:
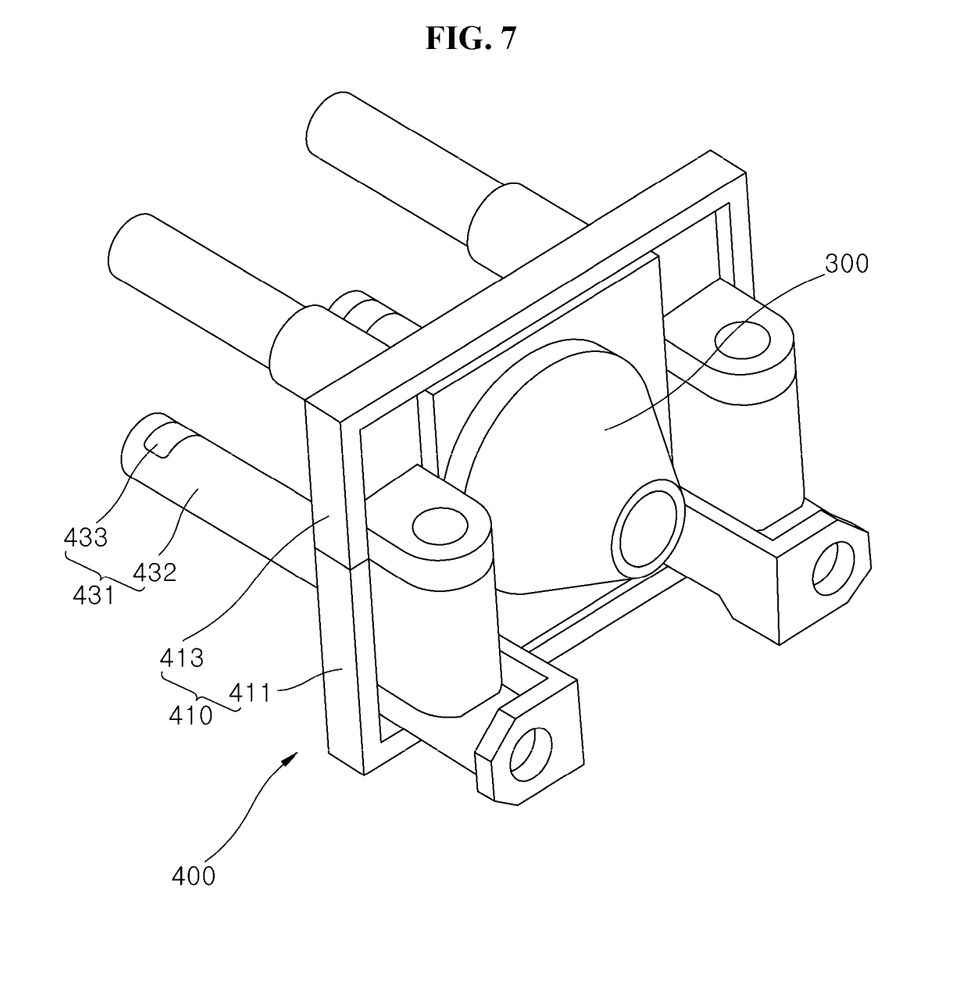
FIG. 7 illustrates that a light guide in accordance with the embodiment of the present invention is coupled to a support.

FIG. 7 illustrates that the light guide in accordance with the embodiment of the present invention is coupled to the support. Referring to FIG. 7, the light guide 300 may be positioned between the light 100 and the optics 200, and guide light irradiated from the light 100 toward the optics 200.

In the present embodiment, the light guide 300 may be implemented with a total internal reflection lens of which the width increases toward the optics 200 from the light 100, and increase the transfer efficiency of light from the light 100 toward the optics 200.

In the present embodiment, the light guide 300 may be inserted into the support 400 from the side of the light 100, and the maximum diameter of the light guide 300 may be set within an error of ±10*mm* based on the diameter of the optics 200. Therefore, the light guide 300 can improve the transfer efficiency of the light transferred to the optics 200.

Figure 8:
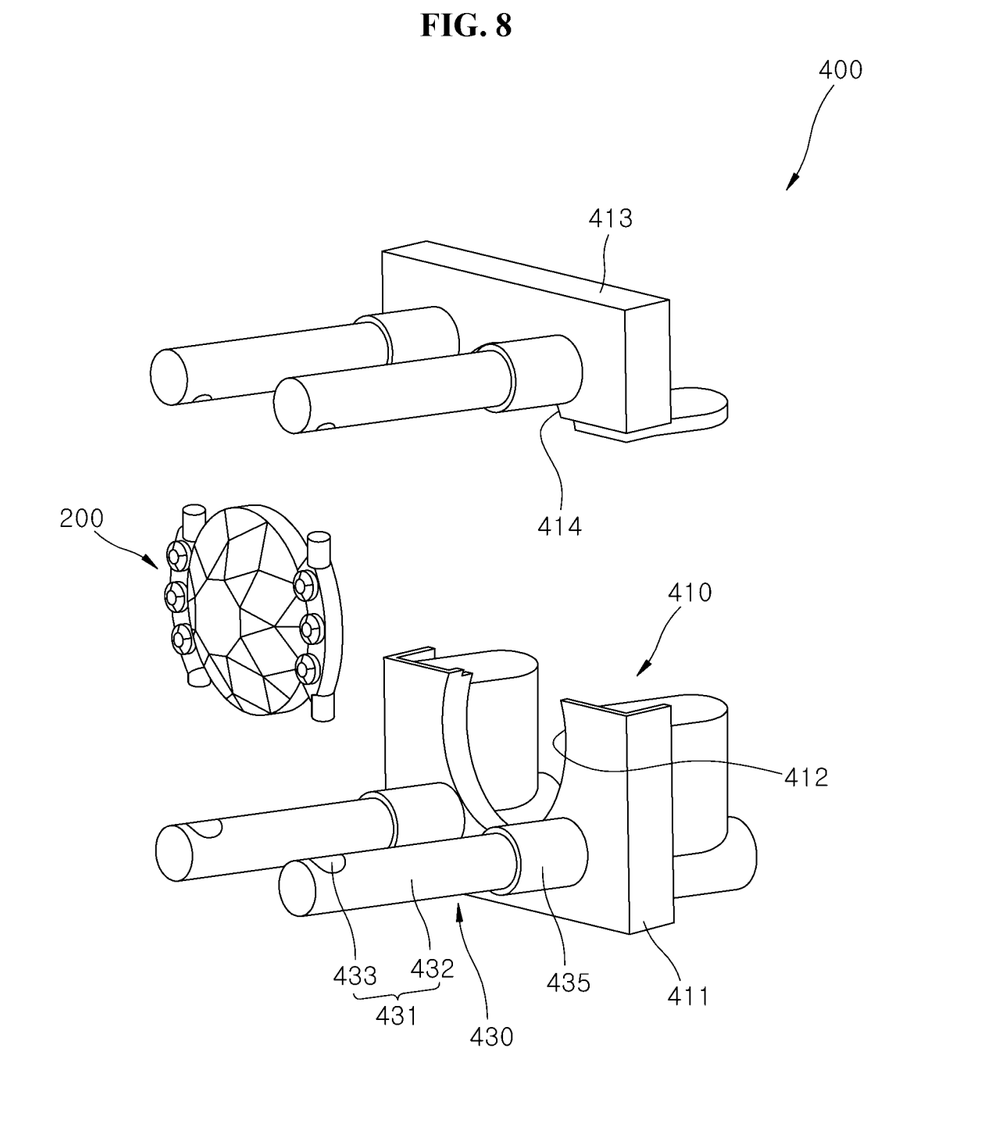
FIG. 8 schematically illustrates that a support base in accordance with the embodiment of the present invention is divided into first and second support bases.

FIG. 8 schematically illustrates that a support base in accordance with the embodiment of the present invention is divided into first and second support bases. Referring to FIG. 8, the support 400 may support the optics 200 or the light guide 300. In the present embodiment, the support 400 may include a support base 410 and an optic support 430.

The light guide 300 may be mounted on the support base 410. In the present embodiment, the support base 410 may include first and second support bases 411 and 413, and thus not only improve the assembling property of the optics 200 and the light guide 300, but also facilitate the manufacturing process of the apparatus.

The first support base 411 may have a first guide mounting groove 412 formed in a concave shape corresponding to the shape of one end of the light guide 300, and the light guide 300 may be seated in the first guide mounting groove 412.

The second support base 413 may have a second guide mounting groove 414 formed in a concave shape corresponding to the shape of the other end of the light guide 300, and support the other end of the light guide 300. The second support base 413 may be detachably coupled to the first support base 411 through bolting or insertion.

Figure 9:
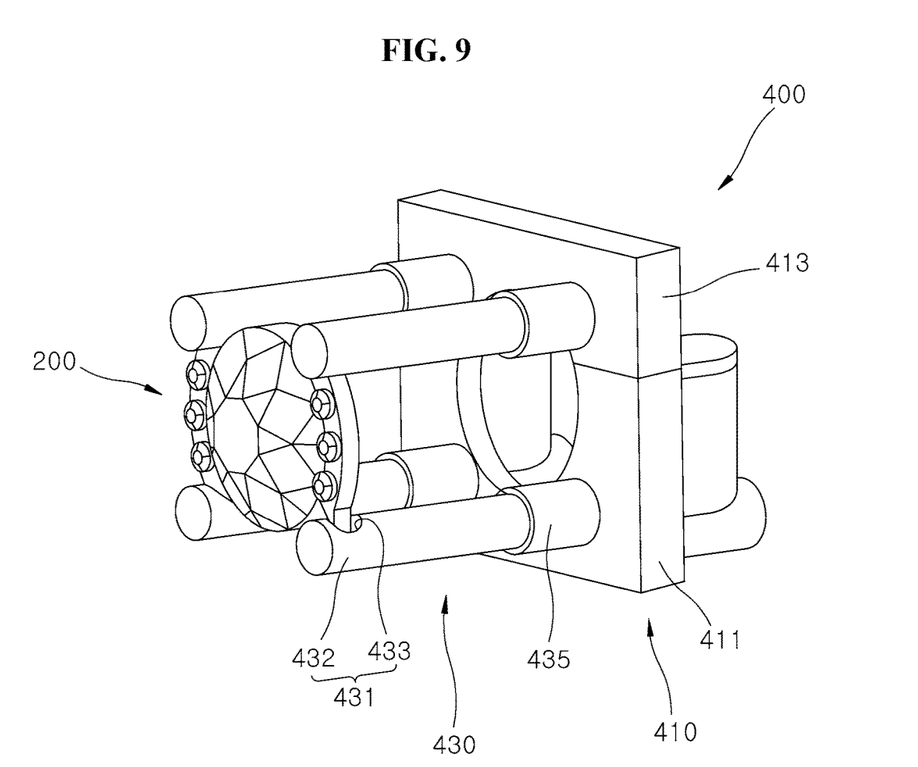
FIG. 9 illustrates that a support in accordance with the embodiment of the present invention supports the optics.
Figure 10:
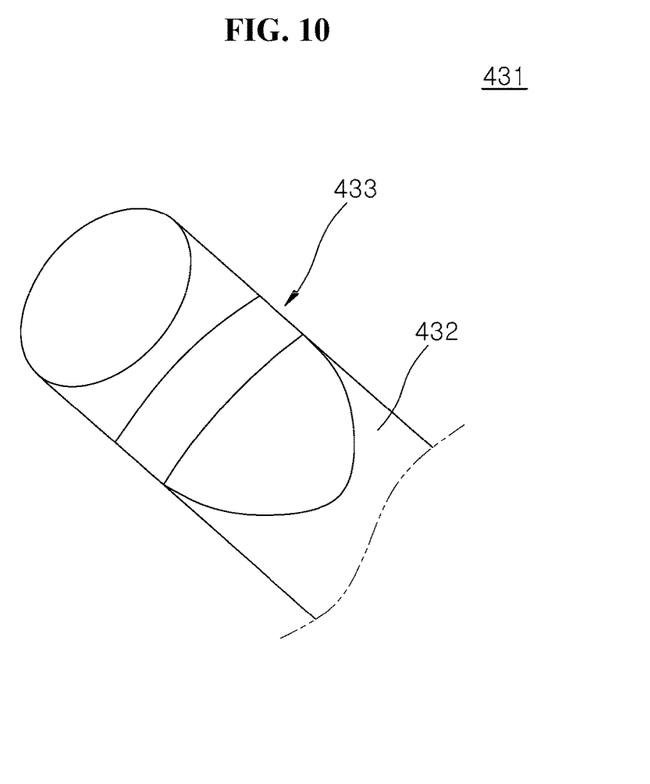
FIG. 10 illustrates an optic support in accordance with the embodiment of the present invention.
Figure 11:
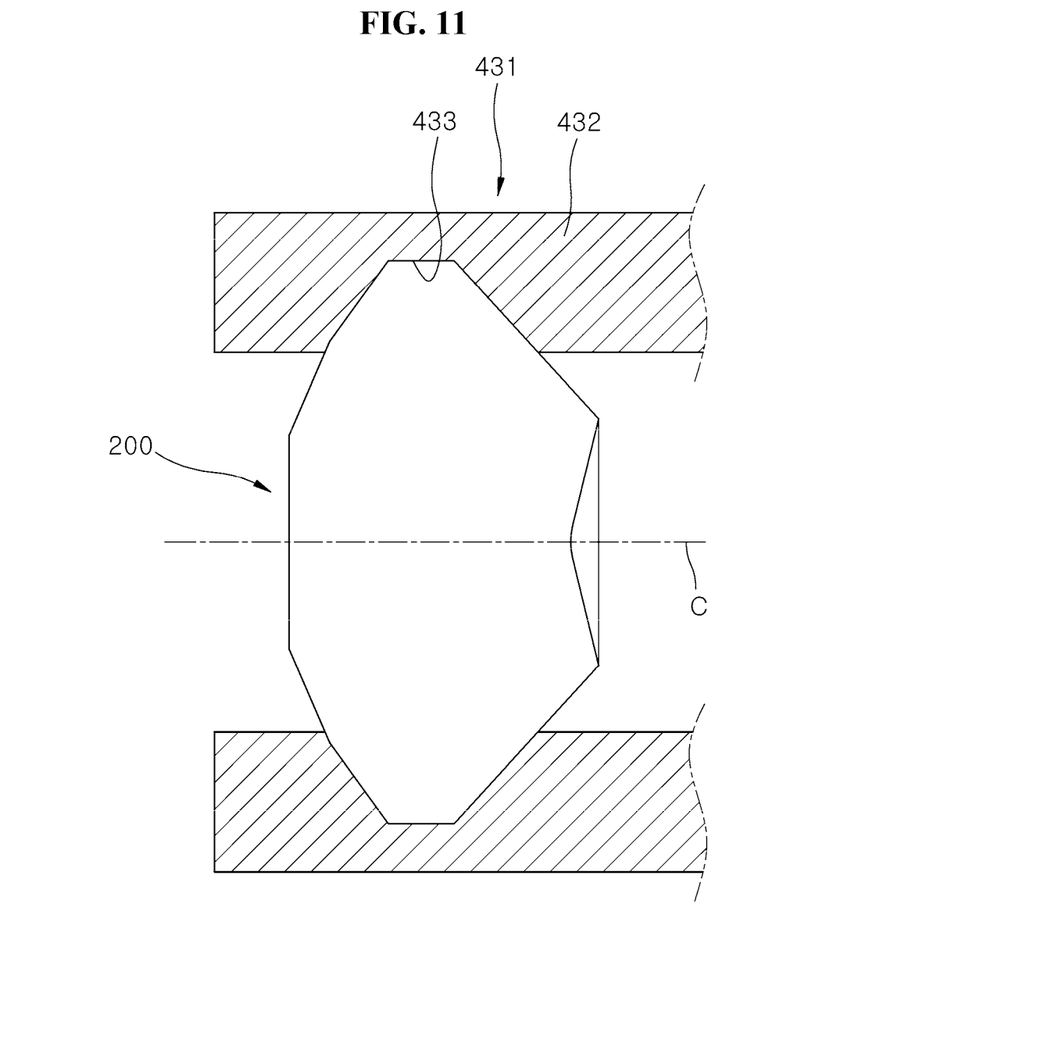
FIG. 11 illustrates that the optic support in accordance with the embodiment of the present invention supports the optic.

FIG. 9 illustrates that the support in accordance with the embodiment of the present invention supports the optic, FIG. 10 illustrates the optic support in accordance with the embodiment of the present invention, and FIG. 11 illustrates that the optic support in accordance with the embodiment of the present invention supports the optic.

Referring to FIGS. 9 to 11, the optic support 430 may connect the support base 410 and the optics 200, and support the optics 200. In the present embodiment, the optic support 430 may include an optic holder 431 and a support adjuster 435.

The optics 200 may be held by the optic holder 431. In the present embodiment, the optic holder 431 may include an optic holder body 432 and an optic holding groove 433.

The optic holder body 432 may be movably inserted into the support adjuster 435, and the position of the optics 200 may be controlled by adjusting the position of the optic holding groove 433 formed in the optic holder body 432.

The optic holding groove 433 may be concavely formed in the optic holder body 432, such that the optics 200 is seated in the optic holding groove 433. In the present embodiment, the optic holding groove 433 may be formed in a shape corresponding to the shape of the optics 200, such that the optics 200 is inserted and fixed into the optic holding groove 433.

The optic holding groove 433 may be formed in a shape corresponding to the shape of the optics 200, the shape of the optic holding groove 433 may be modified in consideration of assembly tolerance of the optics 200, and a sound absorption pad may be applied to prevent noise caused by a damage or vibration of the optics 200.

The optic holder 431 may be movably mounted in the support adjuster 435, and the support adjuster 435 may be coupled to the support base 410. The support adjuster 435 may be formed in a shape surrounding the optic holder 431, and the optic holder 431 may be coupled to the support adjuster 435 through bolting or insertion, such that the position thereof can be adjusted. Thus, the distance between the optics 200 and the light guide 300 may be adjusted and maintained at a predetermined distance of 10*mm* or more, for example.

Figure 12:
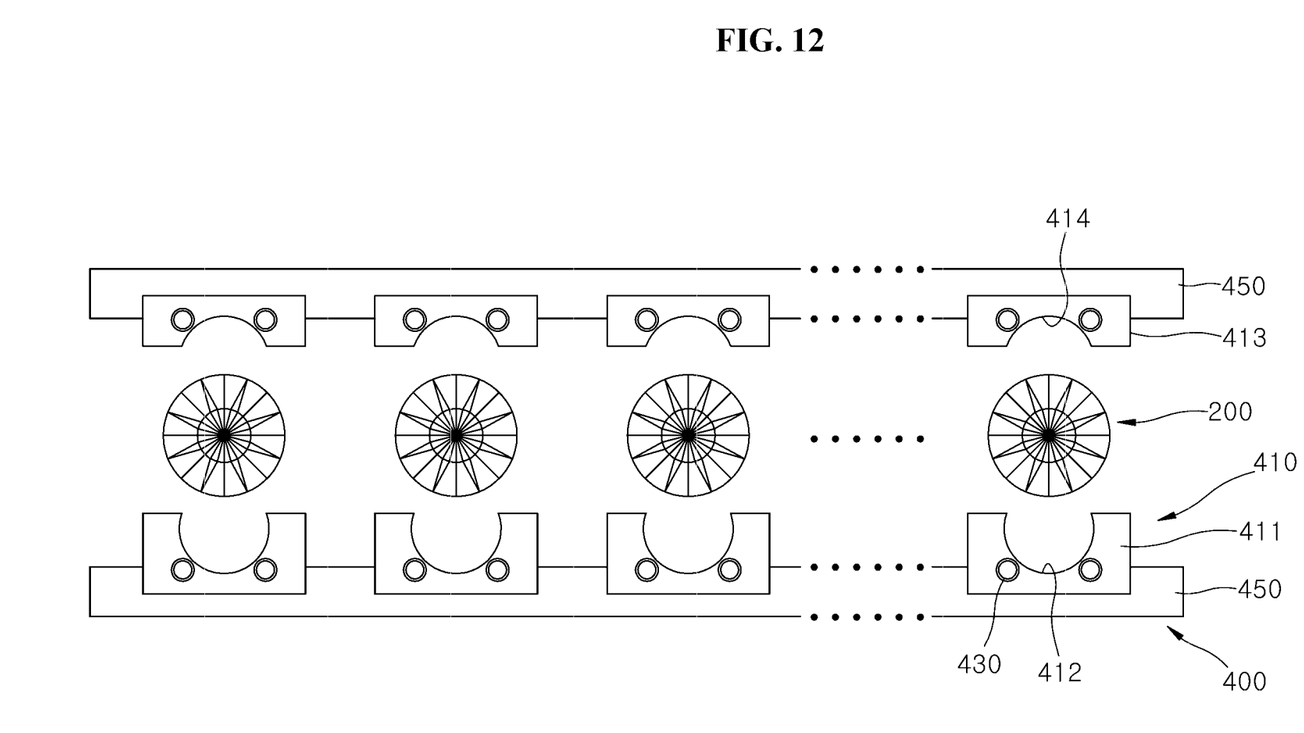
FIG. 12 illustrates that a plurality of optic supports in accordance with the embodiment of the present invention are installed so as to correspond to a plurality of optics.

FIG. 12 illustrates that a plurality of optic supports in accordance with the embodiment of the present invention are installed so as to correspond to a plurality of optics.

Referring to FIG. 12, the support 400 in accordance with the present embodiment may include a plurality of support bases 410 corresponding to a plurality of optics 200 and light guides 300, and the support bases 410 may be connected through a support base connection 450 and operate as one component.

Hereafter, the operation principle and effect of the lamp apparatus 1 in accordance with the embodiment of the present invention will be described as follows.

When the light 100 is turned on, light generated from the light source 130 may be transferred to the optics 200 through the light guide 300. In the present embodiment, the light guide 300 may be implemented with a total internal reflection lens, in order to reduce a loss of the light generated from the light source 130 as much as possible. The light guide 300 may switch the moving path of the light generated from the light source 130 to a path parallel to the rotation axis C of the optics 200, and transfer the light to the inlet 210.

The light transferred to the inlet 210 may be discharged to the front of the optics 200 through the optical connector 250 and the outlet 230. In the present embodiment, since the inlet 210 is formed concavely toward the outlet 230 and the second inlet 213 positioned in the center of the inlet 210 is formed in an aspheric shape, the light inputted to the inlet 210 may prevent an occurrence of hot spot while the light passes through the optics 200.

The lamp apparatus 1 in accordance with the present embodiment can reflect external light such as solar light and thus implement a light emitting effect, even when the light 100 is turned off.

The external light such as solar light may be inputted into the optics 200 through the table 231 and the discharge surface 233 of the outlet 230. The light inputted through the outlet 230 may be reflected from the inner surface of the optical connector 250, transferred toward the outlet 230, and then discharged to the outside.

In the present embodiment, the table 231 may be formed in an octagonal shape, and the plurality of facets may be applied to the discharge surface 233 and the optical connector 250, such that the light inputted through the outlet 230 can be re-discharged toward the outlet 230.

The position of the optics 200 may be adjusted by changing the length of the optic support 430 supporting the optics 200.

Thus, when the light 100 is not only turned on, but also turned off, the lamp apparatus 1 in accordance with the present embodiment can implement a light emitting effect, thereby improving the visibility and the sense of beauty of the lamp apparatus 1.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A lamp apparatus, comprising:
 a light source;
 optics comprising an inlet configured to receive light irradiated from the light source, an outlet configured to discharge the light inputted from the inlet and comprising a plurality of facets formed thereon, and an optical connector connecting the inlet and the outlet;
 wherein the inlet is formed in a concave shape toward the outlet;
  wherein the inlet comprises: a first inlet formed in a concave shape toward the outlet, and formed in a ring shape such that the circumference of the first inlet is connected to the optical connector;
  a second inlet formed in an aspheric concave shape toward the outlet, such that the circumference of the second inlet is connected to an inner circumferential surface of the first inlet;
 a light guide positioned between the light source and the optics, and configured to guide the light irradiated from the light source toward the optics; and
 a support configured to support the optics or the light guide.

2. The lamp apparatus of claim 1, wherein the outlet comprises:
 a table formed perpendicular to a rotation axis of the optics; and
 a discharge surface connecting the table and the optical connector, and comprising the plurality of facets formed on an outer circumferential surface of the discharge surface.

3. The lamp apparatus of claim 2, wherein the table is formed in a polygonal shape, and
 the discharge surface further comprises a plurality of first, second, and third discharge facets formed on the outer circumferential surface thereof, wherein the first discharge facets are connected to respective edges of the table, the second discharge facets are connected to the optical connector, and the third discharge facets connect the first discharge facets and the second discharge facets.

4. The lamp apparatus of claim 1, wherein the optical connector comprises:
 a discharge connector connected to the outlet; and
 an input connector connecting the discharge connector and the inlet, and having a perimeter decreasing toward the inlet.

5. The lamp apparatus of claim 4, wherein the input connector has a plurality of first and second connection facets alternately arranged on an outer circumferential surface of the input connector, wherein the first connection facet has a width decreasing toward the inlet from the discharge connector, and the second connection facet has a width decreasing toward the discharge connector from the inlet.

6. The lamp apparatus of claim 1, wherein the light guide comprises a total internal reflection (TIR) lens, a width of the TIR lens increases toward the optics from the light source.

7. The lamp apparatus of claim 6, wherein the support comprises:
 a support base having the light guide mounted therein; and an optic support connecting the support base and the optics to support the optics.

8. The lamp apparatus of claim 7, wherein the support base comprises:
a first support base having a first guide mounting groove formed in a concave shape corresponding to one end of the light guide, and supporting the one end of the light guide; and
a second support base having a second guide mounting groove formed in a concave shape corresponding to the other end of the light guide to support the other end of the light guide, and detachably coupled to the first support base.

9. The lamp apparatus of claim 7, wherein the optic support comprises:
an optic holder holding the optics; and
a support adjuster having the optic holder movably mounted therein, and coupled to the support base.

10. The lamp apparatus of claim 9, wherein the optic holder comprises:
an optic holder body movably inserted into the support adjuster; and
an optic holding groove formed in a concave shape in the optic holder body, such that the optics are held in the optic holding groove.

\* \* \* \* \*